Oct. 27, 1959  K. HILDEBRAND  2,909,958
METHOD AND DEVICE FOR ELECTRO-OPTICAL DISTANCE MEASUREMENT
Filed Nov. 21, 1956
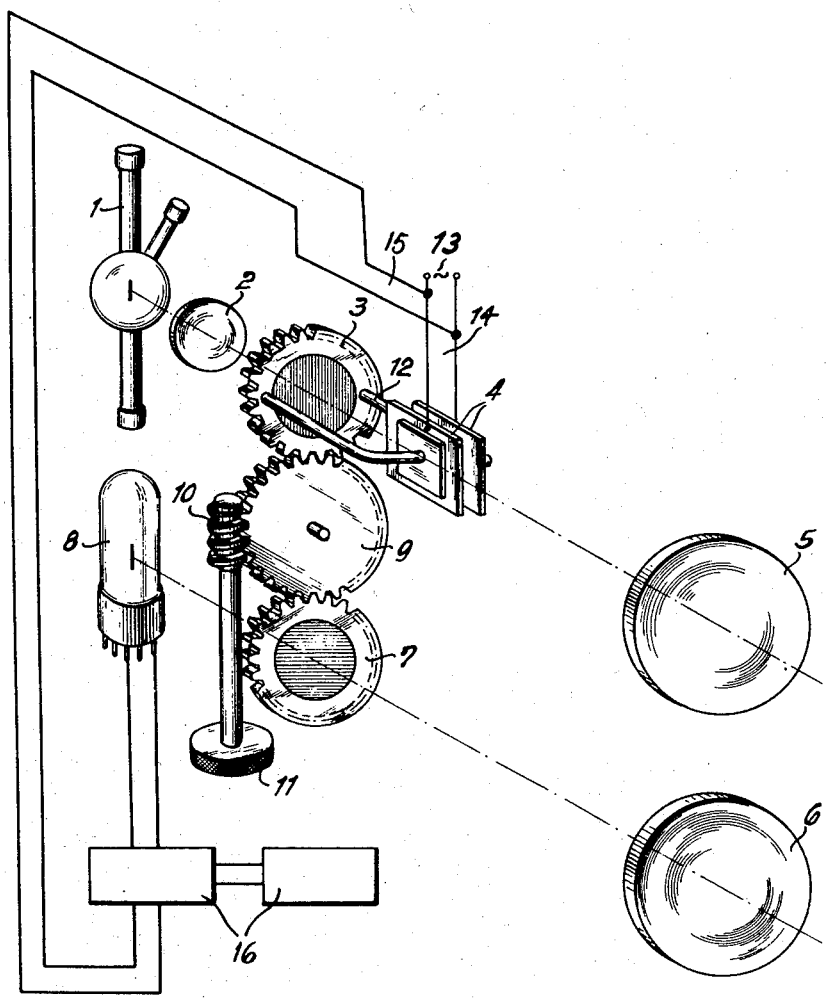
INVENTOR
Klaus Hildebrand
BY
ATTORNEY

United States Patent Office 2,909,958
Patented Oct. 27, 1959

2,909,958

METHOD AND DEVICE FOR ELECTRO-OPTICAL DISTANCE MEASUREMENT

Klaus Hildebrand, Berlin-Neukoelln, Germany, assignor to Askania-Werke A.G., Berlin-Friedenau, Germany, a corporation of Germany Application November 21, 1956, Serial No. 623,571

Claims priority, application Germany November 24, 1955

5 Claims. (Cl. 88—1)

This invention relates to that type of distance measurement wherein the distance to be measured is traversed by a signal, a characteristic of which is then determined. Such measurement has heretofore been effected by electromagnetic radiations such as visible light, passing through crossed Nicols or the like, with associated control or modulation means and with ultimate reception in a receiver cell and a circuit comprising the same, adapted to measure a distance-conditioned phase shift or the like. The precision of the measurement, which theoretically can be quite high, has heretofore been reduced by unavoidable distortions of the signals, including the distortion of light polarization, resulting from the occurrence of unpredictable types of radiations in open spaces; and it is particularly in open spaces, such as distances of miles or at least of many feet, that measurement of the present type finds one of its principal applications.

Therefore it is an object of this invention to minimize such distortion and thereby to add to the precision of the distance measurement, mainly in open spaces.

This has been achieved by a remarkably simple arrangement and control of basically known, signal manipulating elements, including crossed Nicols and the like, as will be understood from the complete disclosure which follows.

In the drawing there is shown, schematically, the transmitter-receiver unit of a system whereby the present method can be applied; these two instruments being united by specific features according to this invention.

A source of suitable electromagnetic radiation is indicated by the numeral 1 and is more particularly shown in form of a well-known quartz mercury vapor lamp. A collector lens 2 collects a maximum quantity of light from this source, desirably in a minimum size beam, for instance in cooperation with a shutter, not shown. The small beam of strong light is then polarized by a polarizer or socalled Nicol, shown as a polarizing filter 3. It then passes through a polarization modulator, specifically for instance through a Kerr cell; the electrodes of such a cell are illustrated at 4, the birefringent liquid and the container for the same being omitted for simplicity's sake. The electrodes and the slot between them lie in a plane suitably oriented, for instance at 45 degrees to the plane of polarization of the polarizer 3; and the slot desirably is very narrow in order to allow the use of low voltages—thereby in turn requiring the use of a precise light beam, produced by source 1 and lens 2. The transmitting instrument is completed, in principle, by an objective lens 5, wherefrom the light passes, across the distance to be measured, to a plane mirror or the like, not shown.

The light is reflected by said mirror to the objective 6 of the receiver part of the present instrument; and the reflected light, which re-traverses the distance to be measured, is unavoidably mixed with stray light or radiation, in the course of geodetical measurements or the like. The intensity of stray light is particularly high during the daytime; nevertheless it is, of course, desired to perform the distance measurements during the day. It is therefore important to minimize not only the relative intensity but also the polarization-distorting effects of the stray light.

This is achieved to some extent by arranging the analyzer or cross Nicol 7 within the receiver. Furthermore, according to the invention, the analyzer is arranged in a rotatable mounting. By means of this mounting the polarization plane of the analyzer 7 can be oriented in any desired way, so long as this plane includes the axis common to the receiving system 6, 7 and so long as it is crossed relative to the polarization plane of the first Nicol 3. In further explanation of these arrangements the following will be noted. As the disturbing effects of stray light are encountered between the transmitter objective 5 and the receiver objective 6, either on the way to or from the remote reflector, these effects were at a maximum in those prior arrangements wherein the analyzer of a distance meter of the present kind was disposed in the transmitter. Placing the transmitter and receiver at one location and placing the analyzer in the receiver reduces these disturbing effects to one-half of the maximum—that is, to the effects potentially encountered between reflector and receiver—if the disturbing light is homogeneous, in the sense of being unpolarized. Actually all light contains greater or lesser components of polarized light; this fact is important for the invention. Adjusting the polarization plane of the receiver Nicol allows the disturbing effect to be reduced to a value which is less, and frequently substantially less, than the aforementioned one-half of the maximum.

It is unpredictable just how the receiver-analyzer must be oriented in order to employ the invention to best advantage, but it is quite easy in practice to determine this. The polarization plane of the various polarized components of light—perhaps it should be called the average polarization plane—varies with the hour of the day and with the orientation of the distance to be measured. For every moment and for every orientation there is one possible orientation of the analyzer 7 which reduces the disturbance to a minimum; and this orientation can readily be determined, in known manner, by means including the photocell 8 of the receiver. When this orientation has been determined and established it is maintained, according to the invention, while the measurement of the distance in question is performed; thereafter a new distant target-reflector can be focussed on, a new minimum of disturbance determined and established, and a new distance measurement performed. The focussing means for training the entire instrument on the remote reflector are not shown herein, for simplicity's sake; but the essential means for determining and establishing the minimum of stray light disturbance are shown.

These means are shown as comprising a gear 9 which can be rotated by a precision mechanism indicated as a worm 10 on the shaft of a knob 11, and which can then rotate the two crossed Nicols 3 and 7 so as to keep them uniformly crossed. It may be noted that the orientations of these Nicols, suggested by cross-hatching, are indicated as being at 90 degrees of one another; assuming now, for instance, a counterclockwise rotation of gear 9 which orients Nicol 7 into a vertical plane, because of horizontal average polarization of the stray light, it will be seen that this orients Nicol 3 into a horizontal plane, thereby keeping it crossed with Nicol 7 as before. Together with the transmitter Nicol 3, the polarization plane rotating valve or cell 4 is rotated, in order that it remain oriented relative to Nicol 3 as before, for instance, as mentioned, at 45 degrees thereto.

For this purpose a rigid structure 12 connects the cell 4 with the transmitter Nicol 3.

Very small masses are manipulated by the mechanism 9 to 12 and such masses are freely movable within the transmitter-receiver instruments, being coupled with larger masses such as the optical system 1, 2, 5, 6 only by light beams. Thus the re-orientation of the polarization system in the instrument and system has practically no disturbing effect upon the focussing of the instrument, once that it has been trained on the remote reflector.

It will be understood by persons skilled in this art that suitable oscillator-control means 13, operated in known manner, send cyclically changing voltages through circuit means 14 into the cell 4. Desirably, the same or closely associated oscillator-control means also impress synchronized changes of voltage and of corresponding sensitivity on the photocell 8, through circuit means 15 schematically shown herein, various forms of which are known. In particular it is known to operate with various combinations of high and low frequency oscillations, frequency multiplications and/or light path adjustments and the like, for purposes of calibration, adjustment and so on. Those details form no part of the present invention, although they are readily and obviously combinable therewith.

Purely for purposes of illustration, operating details may be sketched as follows, for one typical application of the invention. Blue and/or ultraviolet light, practically unpolarized at the source, may be sent out by lamp 1; and correspondingly the photocell 8 may contain one or desirably several photo-cathodes arranged in electron multiplier fashion as is well known and not illustrated herein; and such electrodes may be coated with potassium hydride, cesium-antimony or the like. The instrument axes 1, 5 and 6, 8 are directed toward the mirror. For minimizing the effect of stray light the above described adjustment is then performed. For this purpose light is emitted from source 1 and directed via polarizer 3 and the remote mirror toward analyzer 7 and photocell 8. Normally the light is extinguished by analyzer 7, but some light is received at 8 if the polarization plane is disturbed by stray light. In that case analyzer 7 is rotated until no reception of stray light can be noted any more.

A suitably controlled frequency pattern is then produced in any known way by oscillator-control means 13, which results in corresponding cycles and/or megacycles of polarizing light modulations in cell 4, thereby ultimately producing the arrival of correspondingly amplitude-modulated light signals at photocell 8. The latter cell is sensitivity modulated in phase with the light modulator cell 4, whereas the modulated light, having traversed and retraversed the unknown distance from the instrument to the reflector, arrives with a phase shift. This phase shift is a direct function of the said distance and of the known wavelength corresponding with the light modulation frequency; it can be measured by known circuitry, schematically indicated at 16.

The accuracy of the phase shift measurement depends on several factors, including particularly: the characteristic polarization curve of the Kerr cell 4; the corresponding curve of the photocell 8, and the angularities between the utilized portions of such curves. It is largely in connection with such angularity that the minimizing of stray polarization, effected by mechanism 11, 12, contributes to the precision of the photocell response, as will be appreciated by persons skilled in such measurements. By virtue of said mechanism, provided in accordance with this invention, very precise electro-optical distance measurements have become available, at all times of the day and without distortion or at any rate with minimum distortion by the influences mentioned.

I claim:

1. In a method of measuring distances and the like: generating a light signal, polarizing it into a first plane, transmitting, remotely reflecting and returning it, reducing its amplitude by analyzation in a second plane transverse to said first plane, photoelectrically determining the degree of such reduction of amplitude, promoting such reduction of amplitude by rotating said second plane while correspondingly rotating the first plane and thereby eliminating effects of stray polarized light from remote regions; promptly thereafter continuing to generate further signals of substantially the same kind, polarizing such further signals into the rotated first plane, cyclically modulating them, transmitting, remotely reflecting, returning and analyzing the modulated signals and photoelectrically comparing the cyclic phase of the returned and analyzed signals with the original phase of cyclic modulation.

2. In a method as described in claim 1, performing all of the several steps described in daylight.

3. In an instrument for measurements of the type wherein a cyclically modulated signal of polarized light is transmitted over and reflected at the end of a distance: a source of light; polarizer means for polarizing the light into a predetermined plane; modulator means rigidly coupled with the polarizer means for cyclically rotating said plane to modulate the emitted and polarized light signal; analyzer means adjacent the source and the polarizer and modulator means; means for rotating the analyzer means and in angular synchronism therewith the coupled polarizer and modulator means; photosensitive means adapted to receive the modulated light through the analyzer; and means for comparing the modulation phase of the received light signal with that of the modulated light signal to be transmitted.

4. An instrument as described in claim 3 wherein the modulator means is a Kerr cell rigidly connected with the polarizer means.

5. An instrument as described in claim 4 wherein said cell has minutely spaced electrodes; the instrument comprising means for directing a strong but small beam of light through the polarizer means and the cell.

References Cited in the file of this patent

UNITED STATES PATENTS

| 2,018,963 | Land | Oct. 29, 1935 |
| 2,184,015 | McFarlane | Dec. 19, 1939 |

FOREIGN PATENTS

| 971,202 | France | July 5, 1950 |

OTHER REFERENCES

"Surveying With the Velocity of Light," Surveying and Mapping, Compton, vol. XIV, No. 3, July–September 1954, pages 283–287.